United States Patent [19]

Lemelson et al.

[11] Patent Number: 4,531,152

[45] Date of Patent: Jul. 23, 1985

[54] TELEVISION SYSTEM AND METHOD

[76] Inventors: Jerome H. Lemelson, 85 Rector St., Metuchen, N.J. 08840; Christian Grund, 2035 Burr Ave., Bronx, N.Y. 10461

[21] Appl. No.: 247,090

[22] Filed: Mar. 24, 1981

Related U.S. Application Data

[63] Continuation-in-part of Ser. No. 81,278, Oct. 3, 1979, abandoned.

[51] Int. Cl.³ .............................................. H04N 5/14
[52] U.S. Cl. ................................................... 358/141
[58] Field of Search .................. 358/140, 141, 3, 160, 358/260, 60, 231, 12

[56] References Cited

U.S. PATENT DOCUMENTS

| | | | |
|---|---|---|---|
| 2,813,148 | 11/1957 | Pensak | 358/140 |
| 3,674,921 | 7/1972 | Goldsmith | 358/3 |
| 3,697,675 | 10/1972 | Beard | 358/3 |
| 3,914,543 | 10/1975 | Kawahara | 358/140 |
| 3,983,328 | 9/1976 | Newell | 358/160 |
| 4,004,079 | 1/1977 | Boston | 358/260 |
| 4,168,509 | 9/1979 | Hartmann | 358/138 |

FOREIGN PATENT DOCUMENTS 2000413 1/1979 United Kingdom ................ 358/140

OTHER PUBLICATIONS

"High Resolution NTSC Television System", Dill, IBM Technical Disclosure Bulletin, vol. 21, #5, Oct. 1978, pp. 2148-2153.

"Research and Development on High Definition Television in Japan", Hayashi, SMPTE Journal, Mar. 1981, pp. 178-186.

*Primary Examiner*—Michael A. Masinick

[57] ABSTRACT

A television transmission and receiving system is provided wherein both high resolution and lower resolution television picture signals may be generated and respectively received by high and lower resolution television receivers to permit owners of both high and lower resolution receivers to receive television signals of the same event or program.

11 Claims, 4 Drawing Figures

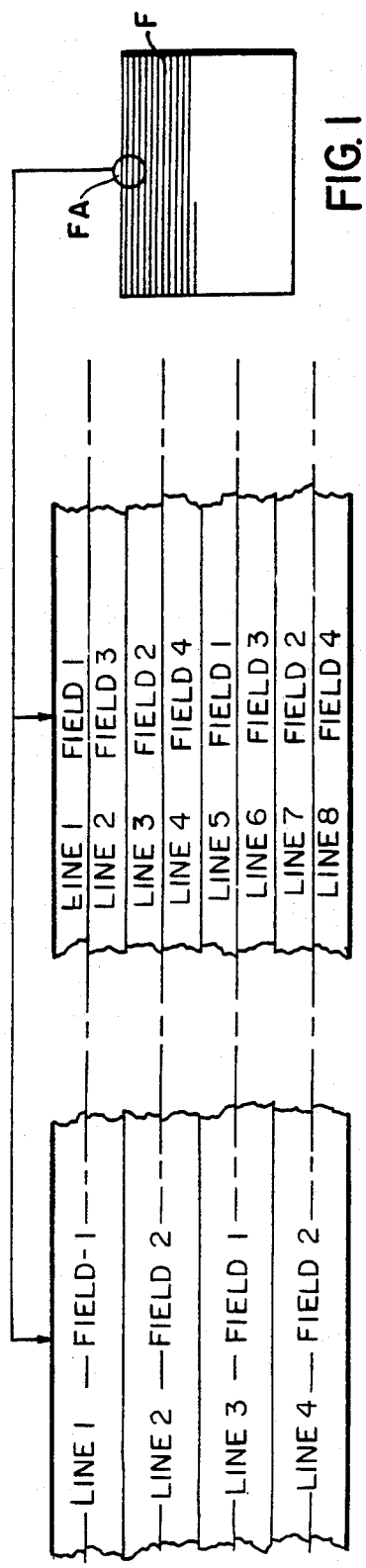
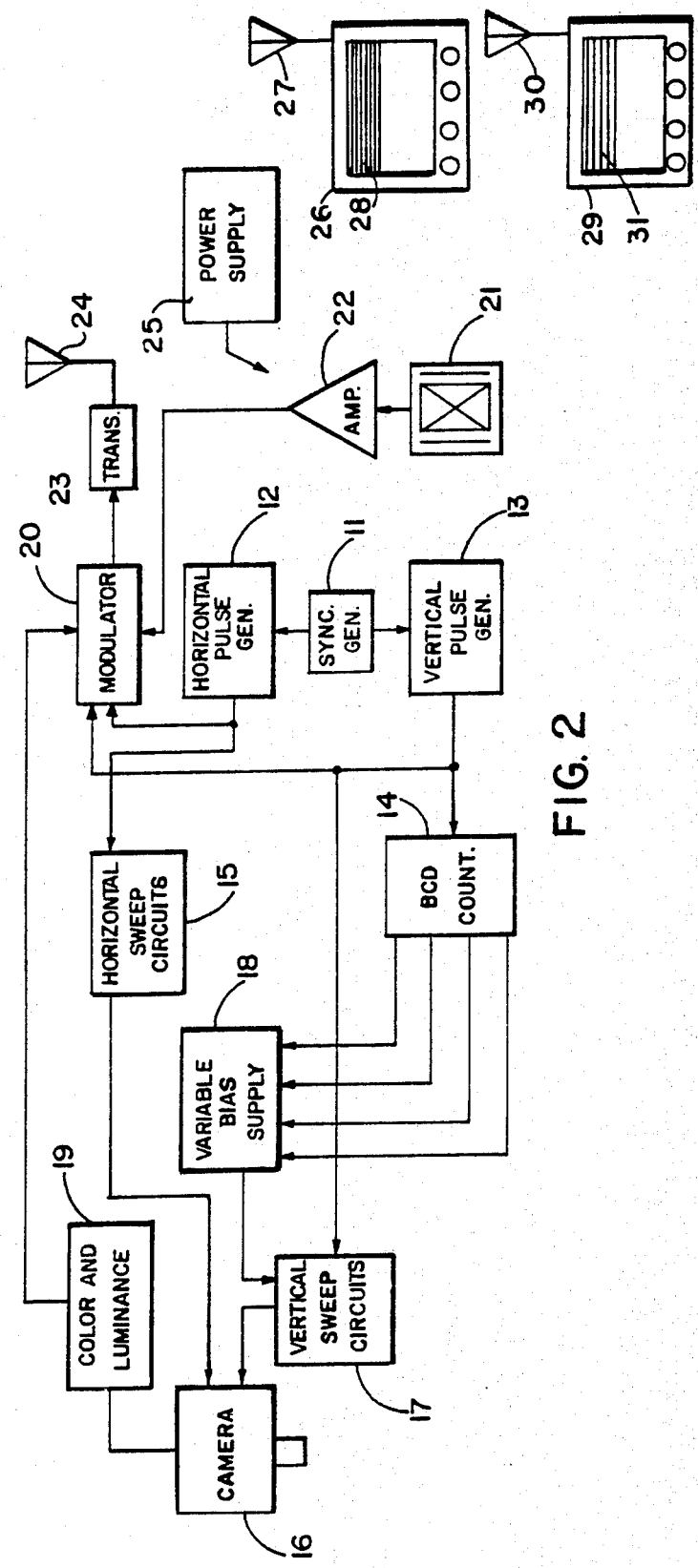

TELEVISION SYSTEM AND METHOD

SUMMARY OF THE INVENTION

This invention relates to a television broadcasting and receiving system and method wherein higher than standard resolution television picture signals are generated and transmitted in a manner whereby they are compatible with both standard television receivers and receivers which are designed and constructed to provide high resolution images on their viewing screens to provide improved picture quality. Such improved picture quality may be particularly applied in projection television systems wherein the image generated on the screen of a television cathode ray tube or the like is projected to many times its size and the imperfections and shortcomings in the lower resolution images generated on standard television viewing screens are more easily discernible when the image field is so enlarged.

Conventional television short wave broadcasting in the United States employs a beam scanning resolution of 525 horizontal lines scanned to define the image field or frame. Picture resolution improves as the number of horizontal scanning lines is increased permitting the image to be viewed in greater detail. By doubling or tripling the number of horizontal lines scanned per screen, substantial improvements are experienced in the images so generated with resulting greater image detail. For example, the image of a page of conventional typewriter printed material occupying an entire television receiver screen which is in the range of 14"-19" in diameter or measured diagonally may be easily read by eye but finer type requires increasing the resolution to perhaps 1050 lines per screen, or greater.

In a preferred form of the invention, a high resolution television camera, say 1050 line resolution, is employed and operated to effect frame scanning wherein each frame is defined by four fields of interlaced scanning of the camera's scanning by its read-beam and the picture signals generated thereby are transmitted with corresponding synchronizing signals which synchronizing signals may be utilized by both high and standard resolution receivers to control the write-beam scanning to generate standard television images at their 525 line resolution with two fields of interlaced scanning while higher resolution television receivers may receive the same signals and effect 1050 line scanning of their image fields or frame using four interlaced field scannings per frame of video information displayed.

Accordingly, it is a primary object of this invention to provide a new and improved television broadcasting and receiving system.

Another object is to provide a television system in which television images are generated at either or both high and lower resolution depending on the receivers employed.

Another object is to provide a high resolution television broadcasting system which is compatible with lower resolution or standard television receivers.

Another object is to provide a television broadcasting system employing a high resolution television camera for generating television signals and special code signals which may be utilized by both high and lower resolution television receivers to generate respective high and lower resolution pictures on their viewing screens.

Another object is to provide a new and improved method for broadcasting and receiving television signals and displaying the information broadcast.

Another object is to provide a method for simultaneously broadcasting high and lower resolution television information and displaying such information on both high and lower resolution television viewing screens.

Another object is to provide a method of coding television signals so that when they are broadcast, they may be employed by television receivers to display the same information at different resolutions.

Another object is to provide a method of generating, coding and transmitting high resolution television signals and receiving such signals by both high and low resolution television receivers and utilizing same to generate images on the screens of both such receivers at their respective resolutions.

With the above and such other objects in view as may hereinafter more fully appear, the invention consists of the novel constructions, combinations and arrangements of parts and method for generating, transmitting, receiving and utilizing high resolution television signals to display both high and low resolution television information as will be more fully described and illustrated in the accompanying drawings but it is to be understood that changes, variations and modifications may be resorted to which fall within the scope of the invention as claimed.

In the drawings:

FIG. 1 is a plan or face view of a television scanning frame displayed by a television receiver.

FIG. 1A is a face view of a portion of the field shown in FIG. 1 wherein the scanning lines and fields thereof are generated at conventional resolution for use by conventional home television set owners.

FIG. 1B is a face view of a portion of the frame shown in FIG. 1 wherein the scanning lines and fields thereof are generated and displayed at a higher resolution and contain twice the number of lines scanned to generate images or frames as the lines employed in the frame shown in FIG. 1A.

FIG. 2 is a schematic diagram showing electronic components and circuits for a standard television system modified to permit the generation and transmission of both conventional and higher resolution television signals and their display.

In FIG. 1 is shown details of a video image field or frame such as the image field or frame scanned by the read-beam of a television camera, or one which is generated by the write-beam of a television receiver cathode ray tube. FIGS. 1A and 1B show respective portions or a portion of such image field frame F enlarged so as to permit comparison between a frame in which standard 525 line scanning is effected and one in which a higher resolution scanning, such as a frame containing 1050 scanning lines, or double that of the standard frame, is generated.

In standard television scanning of the type which is employed to transmit conventional television programs by short wave transmission within the United States, scanning lines of picture information are generated in which two separate scanning sweeps or field are effected with the scanning lines of one field interposed between those of the other so as to provide a so called interlaced scanning system wherein the spaces between lines of one field of such interlace scanning are occupied by the horizontal scanning beam traces or lines of the next field in order to provide suitable resolution and to eliminate so called flicker in the picture or image so generated. U.S. Pat. Nos. 4,251, Eriksen and 3,116,436, Sweeney set forth the standard television transmission system which uses two interlaced fields, each having 262½ lines or 525 lines per frame. The fields are at 60 hertz and the frames are at 30 hertz. The frame shown in FIG. 1A is one which is generated by interlacing two successive field scans, which two field scanning constitutes a complete picture frame defining a complete image. In the representation of the higher resolution enlargement shown in FIG. 1B, the same image field scanned in FIG. 1A is defined by four full-frame interlaced scannings or fields rather than the conventional two interlaced scannings or fields. Each full-frame scan in FIG. 1B is composed of scanning lines scanned wherein each beam trace covers one-half of the width covered by the beam trace of a beam scanning a standard 525 line field. With reference to the scanning lines of each frame, the following comparisons of line traces for the herein provided system for standard and high resolution scanning the same image field, may be made:

| Standard Scanning | High Resolution Scanning |
| --- | --- |
| First field of frame 1 scanned | First field of frame 1 scanned |
| Second field of frame 1 scanned | Second field of frame 1 scanned |
| First field of frame 2 scanned | Third field of frame 1 scanned |
| Second field of frame 2 scanned | Fourth field of frame 1 scanned |

Thus it is seen that for each frame of high resolution video picture information which is generated by the high resolution television camera or reproduced from a recorder, two frames of transmitted television image information are written on the screen of the standard television receiver.

In other words, conventional television receivers may, without modification, process and reproduce the incoming high resolution television signals as though they were conventional low resolution signals in the following manner:

Each line of the first field of the transmitted four field interlaced frame of video picture information is generated along the horizontal scanning line area of the conventional television receiver screen which would ordinarily be scanned in generating the first field of a frame consisting of two fields of interlaced scanning. Each line of the second field defined by such higher resolution video signal is generated along the horizontal scanning area which ordinarily would be scanned in generating the second field of such two-field interlaced frame. Each line of the third field defined by the received high resolution video signal is generated along the line area of the display screen which is ordinarily scanned in generating the first field of a received frame while each line of the fourth field of the frame of the higher resolution video signal is generated along the line area of the display screen which is ordinarily scanned to generate the second field of the two-field interlaced scanning system frame.

Thus one full frame, which is composed of video picture signals derived from four interlaced scannings of the field by the video camera is properly processed and displayed by a conventional (525 line) television receiver as though the picture frame received were composed of two frames of conventional video information, each defined by two interlaced fields.

The time required to transmit each field of high resolution video information is consistent with the time required to transmit a single field of conventional video information. However, a complete high resolution frame is transmitted and received in twice the time it takes to transmit and receive the lower resolution conventional frame.

In FIG. 2 is shown a schematic diagram defining electronic components employed in a standard television transmission system which is modified to permit its performance as described, wherein scanning control of the signal or picture generating beam may define either the described high or low resolution scanning systems illustrated in FIGS. 1A and 1B. System 10 of FIG. 2 includes a standard television transmission set, the design and operation of which are well known in the art. A sync generator 11 produces signals for controlling operation of a horizontal pulse generator 12 and a vertical pulse generator 13 at standard frequencies for whatever television system is used, such as a 525 line scanning system. The output of the vertical pulse generator 13 applies clock pulses, one for each frame scanned, to a counter circuit 14. Counter 14 may comprise, for example, a BCD counter which resets at the count of five to provide scanning of the type illustrated in FIG. 1B, and which sequentially steps through its outputs upon receipt of each pulse from the pulse generator 13 (e.g., one pulse for each complete vertical frame). The scan sequence for four sequential fields, which are interlaced to form a complete video frame or picture, may be described as follows:

On receipt of the initial horizontal sync pulse from pulse generator 12, the horizontal sweep generator 15 outputs the horizontal sweep signal to the television camera 16, thereby effecting controlled horizontal scanning of the image field by such camera in a conventional manner. Simultaneously, as such signals are generated, the first vertical pulse from generator 13 is generated for controlling the read-beam of the television camera in attaining vertical scanning movement through its scanning field by controlling the vertical deflection control circuit 17 of the camera. Deflection control circuit 17 is additionally energized with a bias voltage from a variable bias supply 18, the bias output of which is determined by which of the outputs of the connected BCD counter 14 is activated. The particular bias value determines the degree the field being scanned is offset from its initial position.

Upon receipt of each subsequent vertical frame pulse from generator 13, counter 14 will step through its sequence causing the proper bias to be output from the variable bias supply 18 to the sweep circuit 17 to properly position the scanning lines of the sequentially generated scanning fields so as to effect the nesting arrangement illustrated in FIG. 1B.

Camera 16, which may be a vidicon, charge coupled device or other imaging device, outputs color and luminance signals which are processed by color and luminance circuits 19 and the signals resulting from such processing are conducted to a modulator 20 together with sound signals, such as voice and music signals, which are picked up by a microphone 21 or are reproduced from a source of such sound signals such as a record tape. Such signals are amplified by amplifier 22 and conducted to modulator 20 which also receives the necessary horizontal and vertical signals from the respective sync generators 12 and 13. All of such signals input to the modulator 20 are processed and integrated to form a composite video picture signal together with audio signals which are transmitted by a short wave transmitter 23 as radiated by an antenna 24 in a form permitting such signals to be received by a television receiver or home set in a conventional manner. Such signals may also be transmitted through a cable television system.

A suitable power supply 25 is provided which is connected to supply proper electrical energy at the correct polarities and magnitudes for appropriately operating the various illustrated components and circuits as described above.

Also shown in FIG. 2 are two television receivers, a high resolution receiver 26 and a conventional home television receiver 29. The conventional receiver 29 has a video image generating screen 31 with a write-beam operable to generate a full-frame image of a television picture by interlaced scanning of the type illustrated in FIG. 1A, say at a horizontal scanning line resolution of 525 lines scanned per frame while the high resolution receiver 26 has a video image generating screen 28 with a write-beam controlled to generate a full-frame video image by interlaced scanning of the type illustrated in FIG. 1B. Notations 27 and 30 refer respectively to receiving antennas for the television receivers 26 and 29. In general, the lower resolution closed circuit or short wave television scanning systems will operate in the range of 250-600 horizontal lines scanned per image screen or full frame of video display while the higher resolution system will operate in the range of 500-1200 horizontal lines scanned per full frame of video image displayed on the screen of the higher resolution receiver, the latter having twice the number of interlaced lines scanned per full frame scanned than the former lower resolution system, it being noted that both the low and high resolution receivers shown in FIG. 2 may display picture information transmitted by a single high resolution scanner or television camera having circuits of the type shown in FIG. 2.

We claim:

1. A television system comprising:
   first means including a television camera for scanning an image and generating high resolution full frame composite video picture signals wherein each full frame high resolution video picture signal is composed of four successive interlaced fields of said image,
   second means for transmitting each of said four successive interlaced scanning fields,
   third means including a first video receiver having a high resolution television image display screen and a write beam for generating video images on said display screen and write beam control means for receiving each of said transmitted four successive interlaced scanning fields and for controlling the operation of its write beam in scanning said display screen in four successive interlaced field scannings to define each full frame scanned and to thereby generate a video image at high image resolution,
   fourth means including a second video receiver with a display screen with an image resolution which is less than the resolution of the display screen of said first video receiver and which produces a display defined by frames each containing two successive interlaced scanning fields of the frame on its display screen, and
   write control means for display screen of said second receiver operable upon receipt of said four successive interlaced scanning fields by said second means for controlling the operation of its write beam to cause the display screen of said second video receiver to display frames of video information having two successive interlaced field scannings and where two successive frames are defined by said four successive interlaced fields.

2. A television system in accordance with claim 1 wherein the resolution of the television image display screen of said first video receiver is twice that of the resolution of the display screen of said second video receiver.

3. A television system in accordance with claim 2 wherein the resolution of the television image display screen of said first television receiver is in the range of 500 to 1200 horizontal scanning lines per frame and the resolution of the television image display screen of said second television receiver is in the range of 250 to 600 horizontal scanning lines per frame.

4. A television system in accordance with claim 1 wherein the resolution of the television image display screen of said first television receiver is approximately 1050 horizontal scanning lines per frame and the resolution of the television image display screen of the short wave receiver of said second television receiver is approximately 525 horizontal scanning lines per frame.

5. A apparatus in accordance with claim 1 wherein said first receiver is operable to present each frame of the picture information displayed as four successive interlaced scannings and said second receiver is operable to present each frame of the picture information as two successive frames composed of two successive interlaced scannings.

6. A method of generating, transmitting and receiving television signals and displaying the information received at either high or lower resolution comprising:
   generating television picture signals at a high resolution,
   transmitting said high resolution television picture signals to a first receiver and employing said high resolution television picture signals to modulate an image display forming part of said first receiver to cause said image display to display the information received at said high resolution,
   simultaneously as the television picture signals are received by said first receiver, transmitting the same high resolution signals to a second receiver and employing the same high resolution signals to modulate an image display connected to said second receiver to cause said image display of said second receiver to display the information received by said second receiver at a lower resolution than that at which the same information defined by the same high resolution video signals which is received and is displayed by said display means of said first receiver.

7. A method in accordance with claim 6 wherein the television pictures displayed by the image display of said first receiver are generated thereon at a resolution which is defined by a multiple of the number of lines defining the resolution displayed by the image display of said second receiver.

8. A method in accordance with claim 7 wherein the television pictures displayed by the image display of said first receiver are generated at a resolution which is defined by twice the number of horizontal scanning lines as the scanning lines displayed by the display of said second receiver.

9. A method in accordance with claim 8 wherein the television pictures displayed by the image display of said first receiver are generated thereon at a resolution of 1050 horizontal lines scanned per frame and the television pictures displayed by the image display of said second receiver are generated thereon at a resolution of 525 horizontal scanning lines per frame.

10. A method in accordance with claim 6 wherein the television information displayed by the image display of said first receiver is composed of frames defined by four interlaced scannings of the write beam of the display thereof and the television information displayed by the image display of said second receiver is composed of two interlaced scannings of the write beam of said second receiver.

11. A televison system comprising:
first means for generating television signals having a resolution which is an integer multiple greater than the resolution of a standard 525 line per frame,
second means for entirely transmitting said television signals,
first high resolution receiver means for receiving said entire transmitted television signals and for displaying said entire transmitted television signal as a high resolution picture which is an integer multiple greater than a standard 525 line per frame system,
second standard 525 line per frame receiver means for receiving the entire transmitted television signal as a standard 525 line per frame display in the same elapsed time as said first receiver displays said high resolution picture and where the complete received television signal is displayed as a standard 525 line per frame picture.

* * * * *